(12) United States Patent
Stutz et al.

(10) Patent No.: US 9,529,085 B2
(45) Date of Patent: Dec. 27, 2016

(54) METHOD FOR MEASURING SPATIAL POINTS

(71) Applicant: HEXAGON TECHNOLOGY CENTER GMBH, Heerbrugg (CH)

(72) Inventors: Reto Stutz, Berneck (CH); Beat Aebischer, Heerbrugg (CH); Marcel Rohner, Heiden (CH); Ingo Bednarek, Heerbrugg (CH)

(73) Assignee: HEXAGON TECHNOLOGY CENTER GMBH, Heerbrugg (CH)

( * ) Notice: Subject to any disclaimer, the term of this patent is extended or adjusted under 35 U.S.C. 154(b) by 283 days.

(21) Appl. No.: 14/361,264

(22) PCT Filed: Nov. 29, 2012

(86) PCT No.: PCT/EP2012/073999
§ 371 (c)(1),
(2) Date: May 28, 2014

(87) PCT Pub. No.: WO2013/079615
PCT Pub. Date: Jun. 6, 2013

(65) Prior Publication Data
US 2015/0077762 A1    Mar. 19, 2015

(30) Foreign Application Priority Data

Nov. 29, 2011    (EP) ..................................... 11191195

(51) Int. Cl.
*G01B 11/00*    (2006.01)
*G01C 15/00*    (2006.01)
(Continued)

(52) U.S. Cl.
CPC ............. *G01S 17/42* (2013.01); *G01B 11/005* (2013.01); *G01C 15/002* (2013.01); *G01S 13/42* (2013.01);
(Continued)

(58) Field of Classification Search
CPC ...... G06K 9/481; G06K 9/52; G01N 21/3504; G01N 21/6452
(Continued)

(56) References Cited

U.S. PATENT DOCUMENTS 4,853,971 A * 8/1989 Nonura ................... G06T 11/40
                                                                382/199
5,644,386 A    7/1997 Jenkins et al.
(Continued)

FOREIGN PATENT DOCUMENTS

CN    101726255 A    6/2010
CN    202025084 U    11/2011
(Continued)

OTHER PUBLICATIONS

European Search Report dated May 14, 2012 as received in Application No. EP 11 19 1195.
(Continued)

*Primary Examiner* — Tri Ton
*Assistant Examiner* — Jarreas C Underwood
(74) *Attorney, Agent, or Firm* — Maschoff Brennan

(57) ABSTRACT

Some embodiments of the invention relate to a method for measuring spatial points with a laser scanner. The method may include: scanning multiple spatial points on an object; determining coordinates of the respective spatial point, determining a close range about a central spatial point with at least two spatial points whose angle coordinates are in a defined angular space adjacent to those of the central spatial point; aggregating coordinates of the spatial points in the specific close range; and replacing coordinates of the central spatial point by aggregating coordinates of the spatial points in the specific close range. In some embodiments, the laser scanner forms the origin of the coordinates, and the coordinates comprise a distance and at least one angle.

31 Claims, 4 Drawing Sheets

(51) Int. Cl.
  *G01S 13/06*    (2006.01)
  *G01S 17/42*    (2006.01)
  *G01S 17/89*    (2006.01)
  *G01S 13/42*    (2006.01)

(52) U.S. Cl.
  CPC .............. *G01S 17/89* (2013.01); *G01B 11/00* (2013.01); *G01C 15/00* (2013.01); *G01S 13/06* (2013.01)

(58) Field of Classification Search
  USPC ........... 356/614–630; 250/201.1–201.7, 221, 250/234–236
  See application file for complete search history.

(56) References Cited

U.S. PATENT DOCUMENTS

| | | | | |
|---|---|---|---|---|
| 5,988,862 | A * | 11/1999 | Kacyra | G01B 11/002 382/195 |
| 7,184,088 | B1 * | 2/2007 | Ball | G01C 11/02 348/348 |
| 9,036,134 | B2 * | 5/2015 | Steffey | G01C 15/002 356/4.01 |
| 9,151,830 | B2 * | 10/2015 | Bridges | G01C 15/002 |
| 9,163,922 | B2 * | 10/2015 | Bridges | G01B 5/008 |
| 9,194,954 | B2 * | 11/2015 | Simon | G01C 11/06 |
| 2009/0190007 | A1 * | 7/2009 | Oggier | G01S 17/89 348/241 |
| 2009/0231582 | A1 * | 9/2009 | Aebischer | G01S 17/42 356/364 |
| 2010/0158361 | A1 * | 6/2010 | Grafinger | C21O 5/441 382/165 |

FOREIGN PATENT DOCUMENTS

| | | |
|---|---|---|
| DE | 10 150 436 A1 | 3/2003 |
| DE | 10 2010 020925 A1 | 11/2011 |

OTHER PUBLICATIONS

Oprisescu, S. et al., "Measurements with ToF Cameras and Their Necessary Corrections," International Symposium on Signals, Circuits and Systems, ISSCS 2007, vol. 1, Jul. 1, 2007, pp. 1-4.

* cited by examiner

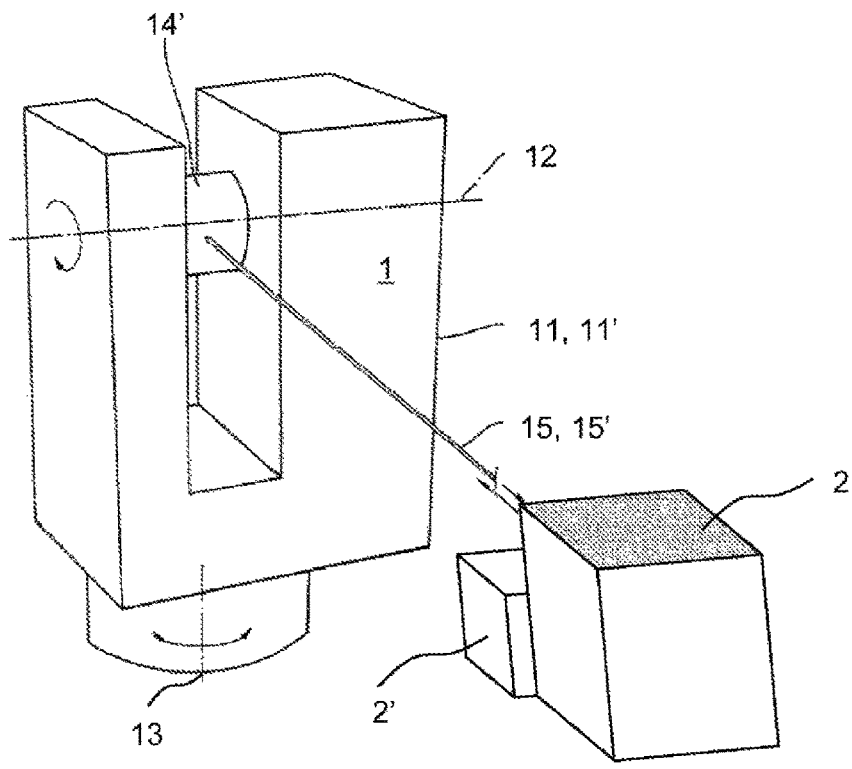
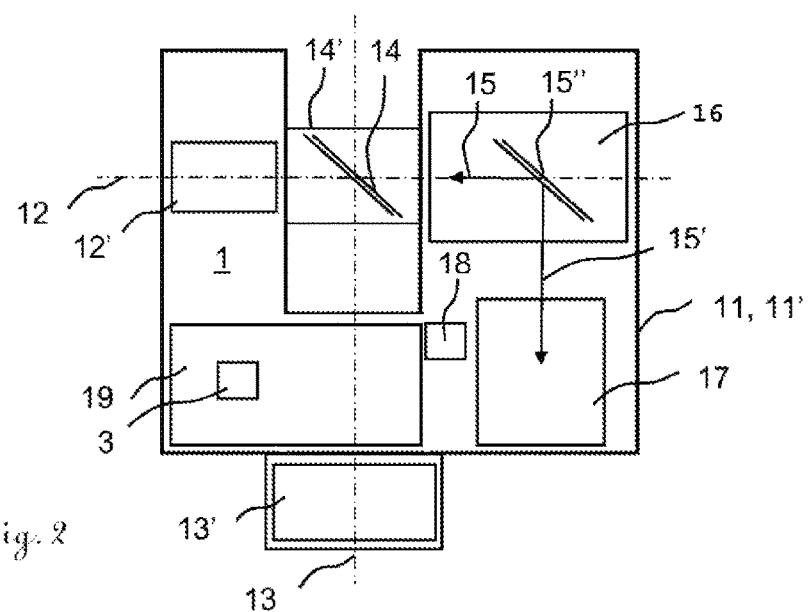
Fig. 1
Fig. 2

METHOD FOR MEASURING SPATIAL POINTS

FIELD OF THE INVENTION

The invention relates to a method for measuring spatial points by means of a laser scanner.

DE 10150436 A1 describes a laser scanner for the contactless scanning of an arbitrarily remote object in three dimensions (3D). Light generated by a laser source is oriented via a mirror onto the object to be scanned, and light reflected from the scanned object is deflected via the mirror and registered by a detector. By adjusting the mirror, light is scanned in chronological sequence over a plurality of various points of the object. The object to be scanned in the meaning of the invention can also be scenery consisting of multiple physical objects, for example, multiple trees, persons, houses, etc.

The mode of operation of the laser scanner is therefore based on the interaction of light with points of the object to be scanned. In the meaning of the invention, this physical procedure is generalized as scattering or reflection of light on spatial points of the object. The mirror positions of the laser scanner in relation to the spatial points of the object are ascertained as elevation or polar angles $\Theta$ and horizontal or azimuth angles $\phi$ via angle sensors. The angles $\Theta$, $\phi$ form an angle space. The mirrors are rotated step-by-step or continuously. The laser source, the detector, and the angle sensors output status signals to a control unit. The status signals indicate the status of the laser scanner at the point in time of the scanning of a spatial point. For every scanned spatial point, the control unit measures either pulse runtimes of the generated and registered light or it measures a phase shift between the generated light and the registered light. The control unit ascertains a distance r from the laser scanner to the scanned spatial point from such measurement data. The operation of the laser scanner is repeated in chronological sequence to ascertain a plurality of distances r and angles $\Theta$, $\phi$. A distance vector having the distance r and the angles $\Theta$, $\phi$ as coordinates is ascertained for every spatial point.

Such a laser scanner is commercially distributed by the applicant under the name Scanstation C10. This laser scanner measures pulse runtimes and implements individual measurements of spatial points. The laser scanner has a field of vision of 360°×270°; over a distance of 0.1 m to 300 m, it ascertains up to $0.5 \times 10^6$ distance vectors per second; in the distance range from 1 m to 50 m, the coordinate position of the object is ascertained with a measurement precision of 6 mm and the distance r of the object is ascertained with a measurement precision of 4 mm.

The measurement precision is limited by various types of noise, which is difficult to quantify, of the output status signals. For example, noise arises due to thermal noise of the detector, due to quantization noise of the photons in the detector, due to local peaks in the avalanche photodiode or pin diode used in the detector. Noise also arises due to photons of the background light. At short distances, shot noise impairs the measurement precision, this shot noise being generated by fluctuations of the incoming signal photons.

Some embodiments of the invention provide for an improved method for operating a laser scanner. A second object of the invention is to provide a method for operating a laser scanner, which scans an object very rapidly and with very high measurement precision. A third object of the invention is to equip an existing laser scanner in a simple manner, in order to scan an object very rapidly and with very high measurement precision.

BACKGROUND

According to the invention, the method for operating a laser scanner has the following steps: scanning at least three spatial points of an object; ascertaining coordinates of the respective spatial point, wherein the laser scanner forms the coordinate origin and the coordinates comprise a distance and at least one angle; defining a vicinity around a central spatial point having at least two spatial points; aggregating coordinates of the spatial points in the defined vicinity; and replacing coordinates of the central spatial point by the aggregation of coordinates of the spatial points in the defined vicinity.

Ascertained coordinates of the central spatial point are advantageously replaced by the aggregation of ascertained coordinates of the spatial points in the defined vicinity by a mean value of ascertained coordinates of the spatial points in the defined vicinity. Therefore, ascertained coordinates may be replaced in a targeted manner by an aggregation of coordinates, preferably by a mean value, taking consideration of secondary conditions, which reduces the measuring error and therefore increases the surface precision during scanning.

It has been shown that during the operation of a laser scanner, an aggregation of coordinates of spatial points in a defined vicinity increases the surface precision of the object to be scanned. According to the invention, the spatial points ascertained by the laser scanner are processed, either in real time or with a time delay. For this purpose, a vicinity of scanned spatial points is formed. One of the scanned spatial points of the vicinity is defined as the central spatial point and at least two scanned spatial points are defined as adjacent to this central spatial point in the angle space. Coordinates of ascertained spatial points in the vicinity are aggregated, which results in a minimization of the measuring error.

Aggregation in the meaning of the invention refers to filtering of the coordinates of ascertained spatial points in the vicinity of a central spatial point; during the filtering, items of coordinate information of the spatial points, preferably the items of coordinate information of all spatial points in the vicinity are considered; and the coordinate of the central spatial point is replaced by an aggregated coordinate. This aggregation is repeated for further registered spatial points, preferably for all registered spatial points. For this purpose, a further vicinity is defined in relation to a further central spatial point, and further scanned spatial points are defined as adjacent to this further central spatial point in the angle space. During the aggregation, there is therefore no data reduction, the number of the spatial points is not reduced, nor is the number of the coordinates reduced. Three secondary conditions are presumed here:
i) the scanning step size from one spatial point to the next spatial point is substantially constant,
ii) the surface of the object to be scanned is substantially continuous, and
iii) the scanning step size is in the order of magnitude of the continuity of the surface of the object to be scanned. Such an aggregation of coordinates is performed with little technical effort and very rapidly.

The spatial points are advantageously scanned by the laser scanner using a scanning step size of an angle, and while using the scanned spatial points, a vicinity is defined, wherein at least those scanned spatial points, which are less than or equal to two scanning step sizes of the angle around the central spatial point, are considered to be adjacent to the central spatial point.

The aggregation of coordinates of the ascertained distance vectors in the defined vicinity is advantageously weighted by a settable filter. The aggregation of the coordinates in the vicinity is therefore formed in a manner weighted by a settable filter, whereby the information content of the ascertained distance vector remains uncorrupted in an objectively comprehensible manner. The standard deviation of the noise is thus decreased by the filter.

SUMMARY

According to the invention, a distance and at least one angle are ascertained as coordinates. The distance can be the direct distance from the laser scanner to the scanned spatial point of the object. The aggregation of coordinates may therefore be carried out in a targeted manner for various parameters of the method for operating a laser scanner, which reduces the measuring error and therefore increases the surface precision during scanning.

In a first embodiment of the method according to the invention, a distance and two angles are ascertained as coordinates. A two-dimensional vicinity is defined around the central spatial point. This vicinity has at least two spatial points, the first angle coordinate of which in a defined angle space is adjacent to that of the central spatial point, and at least two spatial points, the second angle coordinate of which in a defined angle space is adjacent to that of the central spatial point.

In a second embodiment of the method according to the invention, a vicinity is defined around the central spatial point, which has at least two spatial points, the angle coordinates of which in a defined angle space are adjacent to that of the central spatial point, and the measured distances of which differ from the distance measured in the central spatial point by not more than a defined threshold value.

The defined threshold value permits an adaptation of the method to deviations from one or more of the secondary conditions i) to iii), i.e., to non-constant scanning step sizes, to discontinuous surfaces of the object to be scanned, or to scanning step sizes which are not in the order of magnitude of the continuity of the object to be scanned. Such an adaptation to the dynamic response of the surface of the object is desired. Such deviations occur at edges or projections of the object. For example, multiple objects such as a building and a tree are scanned, wherein the building in the field of vision of the laser scanner is at least partially concealed by the tree, the tree stands in front of the building. There is a discontinuity between tree and building, which corresponds to reality and is desired. Filtering of this discontinuity would corrupt the information content of the ascertained distance vectors.

Advantageous refinements of the embodiments of the invention result from the features of the dependent claims.

Further advantages and features of the invention are apparent as examples and schematically from the following description of preferred embodiments in conjunction with the appended figures.

BRIEF DESCRIPTION OF THE DRAWINGS

FIG. 1 shows a view of a part of an embodiment of a laser scanner;

FIG. 2 shows a section through the laser scanner according to FIG. 1;

DETAILED DESCRIPTION

Figure 3:
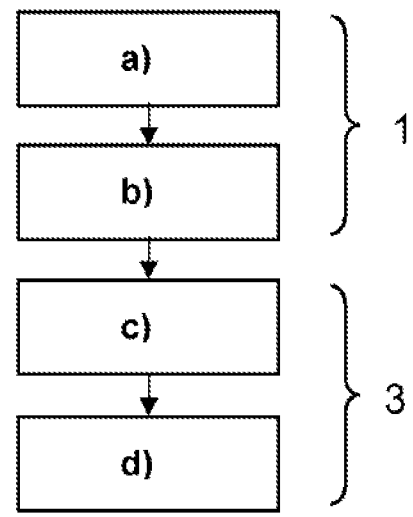
FIG. 3 shows a flow chart of the steps of the method for operating the laser scanner according to FIG. 1.

FIG. 1 is a schematic illustration of a laser scanner 1 for the contactless scanning of a remote object 2, 2' in three dimensions (3D) or in two dimensions (2D). The laser scanner 1 can be suitable for the special monitoring, registration, digitization, etc. of static or dynamic objects 2, 2', however, the laser scanner 1 can also be a geodetic multi-function device such as a tachymeter, a total station, etc. in the case of general engineering and structural surveying of objects 2, 2'. The object 2, 2' schematically consists of a first cube 2 and a second cube 2', wherein the field of vision of the laser scanner 1 on the first cube 2 is partially concealed by the second cube 2'. In principle, an arbitrary number of objects 2, 2' may be scanned. The laser scanner 1 can scan a full panorama having a field of vision of 360°×360° by 360° pivots around two pivot axes and thus completely scan scenery having multiple objects.

The laser scanner 1 has a static base as a bottom part and a pivoted support 11. The support 11 comprises a first drive 12' of a tilt axis or horizontal pivot axis and a second drive 13' for a standing axis or vertical pivot axis 13. A 2D laser scanner only has one such drive. The first drive 12' and the second drive 13' are activated via manipulated variables. A deflection head 14' is pivotable by 360° about the horizontal pivot axis 12 and pivotable by 360° about the vertical pivot axis 13, for example. While the support 11 is constructed from a solid housing 11' having a high level of stiffness, the deflection head 14' consists of as few light parts as possible to allow high revolution speeds of the horizontal pivot axis 12. The laser scanner 1 has an electrical power supply (not shown) of the components of the laser scanner 1.

FIG. 2 shows a section through the housing 11' of the support 11. A laser source 16, which is arranged in the support 11, generates light 15, which is oriented in the horizontal pivot axis 12 on a mirror 14 and is oriented by pivoting the support 11 via the mirror 14 onto the object 2 to be scanned. Light 15', which is scattered or reflected on the object 2, 2', is redirected via the mirror 14 and registered by at least one detector 17 arranged in the support 11. A deflection mirror 15" deflects the registered light 15' out of the horizontal pivot axis 12 onto the detector 17. The laser source 16 is an active sensor system. The light 15, 15' consists of electromagnetic waves such as radio waves, microwaves, visible light, x-ray radiation, or gamma radiation. The detector 17 is, for example, an avalanche photodiode or a pin diode. At least one angle sensor 18 ascertains the pivot positions of the mirror 14; this is performed, for example, by registering relative movements, which are formed by the pivoting of the mirror 14, of optical marks in relation to a reference. The angle sensor 18 therefore registers the first angle, the horizontal or azimuth angle φ of the vertical pivot axis 13 in relation to the scanned spatial point of the object 2, 2', and the second angle, the elevation or polar angle Θ of the horizontal pivot axis 12 in relation to the scanned spatial point of the object 2, 2'.

The laser source 16, the detector 17, and the angle sensor 18 output status signals to a control unit 19. The status signals indicate the status of the laser scanner 1 at the point in time of the scanning of a spatial point. The control unit 19 analyzes the status signals. For this purpose, the control unit 19 measures, for every scanned spatial point, either pulse runtimes of the generated light 15 and the registered light 15' or a phase shift between the generated light and the registered light 15'. From the measured pulse runtimes or phase shift, the control unit 19 ascertains a distance r of the distance vector E for the distance between the laser scanner 1 and the scanned spatial point of the object 2, 2'. The ascertained distance vector E is stored as a 3D triple with respect to an (r, Θ, φ) coordinate system in a computer-readable data memory of the control unit 19. The ascertained distance vector E has as coordinates the distance r, the azimuth angle φ, and the polar angle Θ. The control unit 19 generates manipulated variables for the first drive 12' and the second drive 13' to pivot the mirror 14 by a settable scanning step size. The mirror 14 is rotated step-by-step during the measurement of pulse runtimes or is rotated continuously during the measurement of the phase shift. The scanning step size of the azimuth angle φ and the scanning step size of the polar angle Θ are accordingly freely settable. The operation of the laser scanner 1 is continuously repeated in chronological sequence for a plurality of distance vectors E. A person skilled in the art can also implement an arbitrarily spiral-shaped scan instead of scanning about pivot axes of the laser scanner occurring in columns. A person skilled in the art can also use another active sensor system such as microwave sensors or ultrasonic sensors instead of a laser source. In addition, a person skilled in the art can also use a Cartesian coordinate system, of course, instead of an (r, Θ, φ) coordinate system.

The laser scanner 1 has an analysis unit 3. The analysis unit 3 can be an integrated component of the control unit 19, as shown in FIG. 2; however, the analysis unit 3 can also be an independent unit, which is physically separated from the laser scanner 1 and the control unit 19, for example, a stationary computer such as a personal computer (PC) or a mobile computer such as a laptop, smart phone, etc. If the analysis unit 3 is an integrated component of the control unit 19, this has the advantage, in comparison to an analysis unit 3 which is physically separated from the laser scanner 1 and the control unit 19, that the analysis occurs significantly more rapidly; in addition, ascertained distance vectors E can be disadvantageously changed by data storage and data transport, for example, they can lose dynamic response or become noisy; the aggregation can then also be adapted to most proprietary software and hardware of the laser scanner 1, thus, for example, only those distances r can be aggregated, of which the angle between the laser scanner 1 and the spatial point of the object has been determined with defined precision. The analysis unit 3 has a microprocessor and a computer-readable data memory.

Program code, which is stored on a machine-readable carrier, is executed in the analysis unit 3 to operate the laser scanner 1. Distance vectors E of the object to be scanned, which are ascertained from the scanned object 2, 2', are communicated as a 3D triple to the analysis unit 3 from the laser scanner 1. The program code can be stored on a computer program product so it is computer-readable, in such a manner that the program code is capable of executing at least one of the following steps of the method for measuring spatial points by means of a laser scanner 1:

defining a vicinity N around a central spatial point S having at least two spatial points, aggregating coordinates r, Θ, φ of the spatial points in the defined vicinity N, and replacing coordinates r, Θ, φ of the central spatial point S by the aggregation of coordinates r, Θ, φ of the spatial points in the defined vicinity N.

FIG. 3 shows a flow chart of the steps of the method for operating the laser scanner 1 in the system having the analysis unit 3. In a step a), the scanning of at least three spatial points of an object and the ascertainment of a distance vector E having at least one coordinate r, Θ, φ from the laser scanner 1 to the scanned spatial point of the object 2, 2' is executed by the laser scanner 1. In a step b), characteristic variables such as signal amplitudes Aj, the signal-to-noise ratios SNRj, or further statistical features of the measurement data are determined. The identifier j stands here for the three coordinate axes r, Θ, φ. Step b) is optional and is established by the setting of the measurement sequence or laser scanner 1. A step c) comprises the definition of a vicinity having at least two spatial points, which are in an angle space adjacent to a central spatial point. In a step d), the aggregation of coordinates of the ascertained distance vectors in the defined vicinity is executed by the computer program means of the analysis unit 3. Latter steps c) and d) are preferably executed for all scanned spatial points. An existing laser scanner 1 for scanning spatial points and for ascertaining a distance vector can be retrofitted with an analysis unit 3 or a computer program means for defining a vicinity having at least two spatial points and for aggregation of coordinates of the ascertained distance vectors in the defined vicinity.

The analysis unit 3 for defining a vicinity and for aggregation of spatial points for every central spatial point S can be located in the laser scanner 1 itself or, however, also on an external computer. Preferably, however, the calculation occurs on the laser scanner 1 directly during the point recording, which substantially simplifies the post-processing. Also, by way of the online improvement, the filtering can also be adapted to the laser scanner 1 by settings of the operator and thus, for example, only the distances may be aggregated. This can be advisable above all in the case of objects in the short distance range, as in the case of interior recordings, where the angle errors hardly influence the precision of the spatial points, i.e., are practically error-free. The scatters of the ascertained distances r, in contrast, are substantial, so that the simplified aggregation reduced to the distance coordinates r already causes a noticeable improvement of the coordinates of the spatial points.

Figure 4:
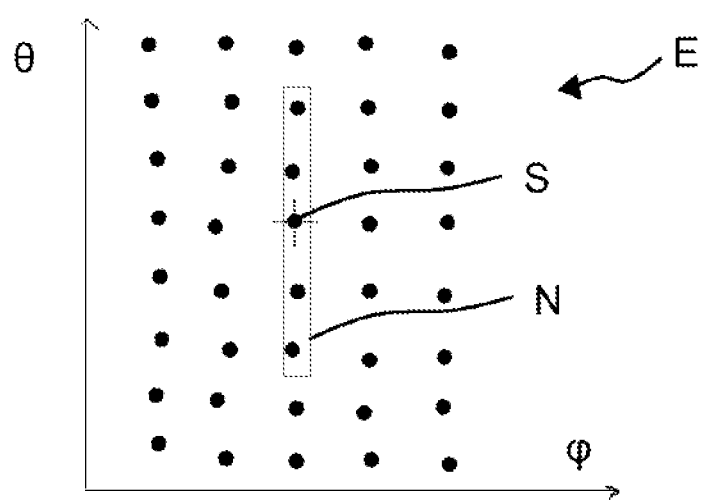
FIG. 4 shows a first embodiment of the aggregation of coordinates of ascertained distance vectors in the method according to FIG. 3.
Figure 5:
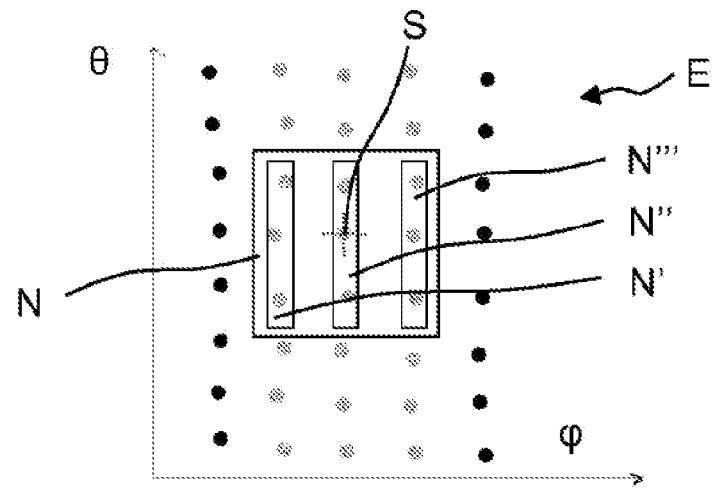
FIG. 5 shows a second embodiment of the aggregation of coordinates of ascertained distance vectors in the method according to FIG. 3.
Figure 6:
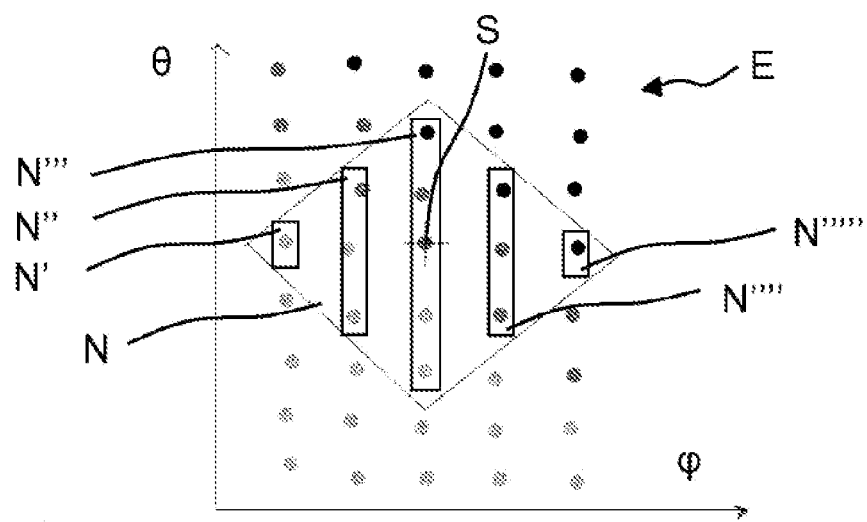
FIG. 6 shows a third embodiment of the aggregation of coordinates of ascertained distance vectors in the method according to FIG. 3.

FIGS. 4 to 6 show three embodiments of the aggregation of the coordinates r, Θ, φ of ascertained distance vectors E using the analysis unit 3. For this purpose, distances r are plotted in the angle space of the azimuth angle φ and the polar angle Θ. The individual points, which are spaced apart more or less uniformly from one another, of FIGS. 4 to 6 are scanned spatial points. The laser beam 15 is pivoted here about the horizontal pivot axis 12, and a first column of spatial points is scanned from bottom to top (or also vice versa) using the scanning step size of the polar angle Θ. After the scanning of the first column of spatial points, the laser beam 15 is pivoted from left to right (or also vice versa) about the vertical pivot axis 13 using a scanning step size of the azimuth angle ϕ, and a second column of spatial points is scanned from bottom to top using the scanning step size of the polar angle Θ. The distances r are plotted as a grayscale image only for clear illustration, wherein the distance r is assigned to a more or less bright or dark grayscale; the darker the grayscale, the greater the distance r. In addition, the distance r of a central spatial point S is standardized to 1.00 as a reference for clear illustration. In FIG. 4, the distances r are all substantially equally dark gray (0.95<r≤1.05) and model a plane of the scanned object 2, 2'. In FIG. 5, the distances r are gray in a middle region (0.95<r≤1.05) and are dark gray in two outer regions (1.05<r≤1.15) and model a groove/a web of the scanned object 2. In FIG. 6, the distances r are light gray in a left bottom region (0.85<r≤0.95); in a middle region, they are gray (0.95<r≤1.05); and in a right top region, they are dark gray (1.05<r≤1.15) and model an inclined surface of the scanned object 2, 2'.

For the aggregation, every scanned spatial point is used once as a central spatial point S, and a vicinity N is defined around the central spatial point S. Every vicinity N has multiple adjacent scanned spatial points in the angle space in relation to the central spatial point S. In FIGS. 4 to 6, the central spatial points S are each identified with a crosshair. The scanned spatial points which are adjacent in the angle space are arranged in closest proximity to the spatial point S. During the aggregation of the distances r, a weighted sum of the distances r in the defined vicinity N is formed, so that a weighted arithmetic mean w results. Therefore, positive and negative deviations of the distances r to scanned spatial points which are adjacent in the angle space are measured with respect to the central spatial point S. In awareness of the present invention, a person skilled in the art can pivot the deflection head only about a single pivot axis. A person skilled in the art can also simultaneously pivot the laser beam about two pivot axes. In addition, a person skilled in the art can omit plotting the distances as a grayscale image and standardizing the distances. Also, a person skilled in the art can also use absolute values of at least one angle between the laser scanner and the scanned spatial point of the object for the aggregation instead of the distances of the ascertained distance vectors. A person skilled in the art can also use absolute values of measured intensities (grayscales) or measured spectral values (colors) for the aggregation instead of the distances of the ascertained distance vectors. Of course, a person skilled in the art can also combine distances of the ascertained distance vectors having absolute values of angles or absolute values of measured intensities (grayscales) or absolute values of measured spectral values (colors) for the aggregation.

According to FIG. 4, a one-dimensional vicinity N has at least three scanned spatial points. The scanned spatial points have been scanned in a column, having the scanning step size of the polar angle Θ, in direct chronological sequence by the laser scanner 1. A scanned spatial point is used as the central spatial point S of the one-dimensional vicinity N in such a manner that at least one adjacent spatial point in the angle space has been scanned chronologically before the central spatial point S, and that at least one adjacent spatial point in the angle space has been scanned chronologically after the central spatial point S.

Currently, 3D measuring tasks are also carried out, however, using laser scanners 1 which register chronologically in parallel, so-called 3D cameras. Such 3D cameras have imaging surface sensors having pixel-by-pixel time measuring circuits, by means of which they register the runtime or phase shift of the modulated light cone reflected from the object. In this case, no chronological sequence is established for the plurality of distance vectors E. However, it can be presumed that the storage of the simultaneously registered spatial points occurs in an arrangement which is equivalent to the chronological sequence of a serially scanning instrument. The expression "chronological sequence of the spatial points" is therefore also to apply for laser scanners 1 which record in parallel.

So as not to corrupt the information content of the ascertained distance vector during the aggregation, symmetrical averaging is performed, i.e., a number of symmetrically arranged adjacent scanned spatial points is defined in relation to the central spatial point S in the angle space. If an asymmetrical arrangement of adjacent scanned spatial points in relation to the central spatial point S is used, the mean value to be formed can be corrupted, for example, it can indicate a real nonexistent inclination of the surface of the object 2, 2'.

Specifically, the one-dimensional vicinity N of the embodiment according to FIG. 4 has five scanned spatial points, of which the third spatial point is used as the central spatial point S and two spatial points in a proximity of one or two scanning step size(s) of the polar angle Θ have been scanned chronologically before the central spatial point S and two spatial points in a proximity of one or two scanning step size(s) of the polar angle Θ have been scanned chronologically after the central spatial point S. This symmetrical vicinity N is aggregated. The aggregation filters using a filter Θ in a dimension along the scanning step size of the polar angle Θ about the horizontal pivot axis 12 of the laser scanner 1. The filter Θ can be uniform, i.e., every spatial point in the vicinity is weighted equally, which results in a uniform filter $$\Theta = \frac{1}{5}[1 \quad 1 \quad 1 \quad 1 \quad 1].$$

However, the filter Θ can also be non-uniform, upon which the central spatial point S is weighted double and upon which also the two spatial points which are located in the closest proximity to the central spatial point S are weighted double, which results in a centrally weighted filter $$\Theta = \frac{1}{8}[1 \quad 2 \quad 2 \quad 2 \quad 1].$$

The non-uniform filter Θ can also be a parabolic weighted filter $$\Theta = \frac{1}{35}[-3 \quad 12 \quad 17 \quad 12 \quad -3].$$

For a uniform filter Θ, an equally weighted arithmetic mean w is ascertained for the one-dimensional vicinity N according to formula (2):

$$w = \frac{1}{5}[1 \quad 1 \quad 1 \quad 1 \quad 1] \cdot [10.022 \quad 10.002 \quad 10.010 \quad 9.097 \quad 10.047]^T \quad (2)$$

wherein the values in the second vector correspond to the distances r of the spatial points in the vicinity N from the laser scanner 1.

For a centrally weighted filter Θ, a centrally weighted arithmetic mean w is ascertained for the one-dimensional vicinity N according to formula (2'):

$$w = \frac{1}{8}[1 \; 2 \; 2 \; 2 \; 1] \cdot [10.022 \; 10.002 \; 10.010 \; 9.097 \; 10.047]^T \quad (2')$$

For a filter Θ weighted in a parabola, an arithmetic mean w weighted in a parabola is ascertained for the one-dimensional vicinity N according to formula (2''):

$$w = \frac{1}{35}[-3 \; 12 \; 17 \; 2 \; -3] \cdot \quad (2'')$$
$$[10.022 \; 10.002 \; 10.010 \; 9.097 \; 10.047]^T$$

According to FIG. 5, a two-dimensional vicinity N is composed of three one-dimensional region segments N', N'', N''' having nine scanned spatial points. Each region segment N', N'', N''' has three scanned spatial points per column, having the scanning step size of the polar angle Θ. The three region segments N', N'', N''' are in the proximity of less than or equal to two scanning step sizes of the azimuth angle φ to one another. The three region segments N', N'', N''' can, but do not have to, border one another. One scanned spatial point is used as a central spatial point S of the two-dimensional vicinity N in a central region segment N'' in such a manner that at least one first region segment N' has multiple spatial points which are adjacent in the angle space, and which have been scanned chronologically before the central spatial point S, and that at least one second region segment N''' has multiple spatial points which are adjacent in the angle space, and which have been scanned chronologically after the central spatial point S. The eight spatial points which are adjacent in the angle space are located in relation to the central spatial point S in an exemplary proximity of one or √2 scanning step size(s) of the polar angle Θ and/or of the azimuth angle φ. This symmetrical vicinity N is aggregated. The aggregation filters using a filter Θ in two dimensions, namely along the scanning step size of the azimuth angle φ about the vertical pivot axis 13 of the laser scanner 1 and along the scanning step size of the polar angle Θ about the horizontal pivot axis 12 of the laser scanner 1. The filter Θ can be uniform, i.e., every spatial point in the vicinity is weighted equally, which results in a uniform filter $$\Theta = \frac{1}{9}\begin{bmatrix} 1 & 1 & 1 \\ 1 & 1 & 1 \\ 1 & 1 & 1 \end{bmatrix}$$

having a 3×3 matrix. However, the filter Θ can also be non-uniform, the central spatial point S is weighted using 4 (2−√2), and the four spatial points which are located in a proximity of √2 scanning step sizes to the central spatial point S are weighted using √2, which results in a centrally weighted filter $$\Theta = \frac{1}{12}\begin{bmatrix} 1 & \sqrt{2} & 1 \\ \sqrt{2} & 4(2-\sqrt{2}) & \sqrt{2} \\ 1 & \sqrt{2} & 1 \end{bmatrix}$$

having a 3×3 matrix.

For a uniform filter Θ, an equally weighted arithmetic mean w is ascertained for the two-dimensional vicinity N according to formula (3):

$$w = \sum_{i,j=1}^{3} \Theta_{i,j} \cdot r_{i,j} \quad (3)$$
$$= \frac{1}{9}(10.022 + 10.005 + 10.013 + 10.002 +$$
$$10.010 + 9.097 + 10.022 + 10.047 + 10.018)$$

wherein $r_{i,j}$ denotes the distance of the jth spatial point in the ith track of the vicinity. For a centrally weighted filter Θ, a centrally weighted arithmetic mean w is ascertained for the two-dimensional vicinity N according to formula (3'):

$$w = \sum_{i,j=1}^{3} \Theta_{i,j} \cdot r_{i,j} \quad (3')$$
$$= \frac{1}{12}(10.022 + \sqrt{2} * 10.005 + 10.013 + \sqrt{2} * 10.002 +$$
$$4*(2-\sqrt{2})*10.010 \ldots + \sqrt{2} * 9.097 + 10.022 +$$
$$\sqrt{2} * 10.047 + 10.018)$$

According to FIG. 6, a two-dimensional vicinity N is used. Multiple spatial points are scanned by the laser scanner 1 in chronological sequence. One scanned spatial point is used as a central spatial point S in such a manner that at least one scanned spatial point which is adjacent in the angle space has been scanned chronologically before the central center of gravity S, and that at least one scanned spatial point which is adjacent in the angle space has been scanned chronologically after the central center of gravity S. The two-dimensional vicinity N of the embodiment according to FIG. 6 is concretely composed of five region segments N', N'', N''', N'''', N''''' having thirteen scanned spatial points. Thereof, six spatial points, which are adjacent in the angle space, have been scanned before the central center of gravity S, and six spatial points, which are adjacent in the angle space, have been scanned chronologically after the central center of gravity S. The first region segment N' and the fifth region segment N''''' have one scanned spatial point per column; the second region segment N'' and the fourth region segment N'''' have three scanned spatial points per column, having the scanning step size of the polar angle Θ; and the third region segment N''' has five scanned spatial points per column having the scanning step size of the polar angle κ. The five region segments N', N'', N''', N'''', N''''' are in the proximity of less than or equal to two scanning step sizes of the azimuth angle φ in relation to one another. The twelve spatial points are therefore located in relation to the central center of gravity S in the angle space in a proximity of one to two scanning step size(s) of the azimuth angle φ and/or of the polar angle Θ. This symmetrical vicinity N, which consists of thirteen distance vectors, is aggregated. The aggregation filters using a filter Θ in two dimensions, namely along the scanning step size of the azimuth angle φ about the vertical pivot axis 13, and along the scanning step size of the polar angle Θ about the horizontal pivot axis 12 of the laser scanner 1. The filter Θ can be uniform, i.e., every spatial point in the vicinity is equally weighted, which results in a uniform filter $$\Theta = \frac{1}{13} \begin{bmatrix} 1 & 1 & 1 & 1 & 1 \\ 0 & 1 & 1 & 1 & 0 \\ 0 & 1 & 1 & 1 & 0 \\ 0 & 0 & 1 & 0 & 0 \\ 0 & 0 & 1 & 0 & 0 \end{bmatrix}$$

having a 5×5 matrix.

For a uniform filter $\Theta$, a weighted arithmetic mean w is ascertained for the two-dimensional vicinity N according to formula (4):

$$w = \sum_{i=1}^{5} \sum_{j=1}^{5-2 \cdot |i-3|} \Theta_{i,j} \cdot r_{i,j} \quad (4)$$

wherein $r_{i,j}$ denotes the distance of the jth spatial point in the ith track of the vicinity. In awareness of the present invention, a person skilled in the art can also form a geometric mean, a harmonic mean, a median, etc. in the case of the aggregation instead of an arithmetic mean. A person skilled in the art can also implement an aggregation based on a wavelet decomposition, a Fourier transform, a Kalman filter, while employing partial differential equations, diffusion equations, the method of total variation, etc. Also, a person skilled in the art can also use, instead of the multidimensional vicinities having 3×3 and 5×5 matrices shown as examples, multidimensional vicinities having 4×4 matrix, 7×7 matrix, etc. In addition, a person skilled in the art can also use an asymmetrical vicinity instead of a symmetrical vicinity, for example, if the scanned spatial points are not arranged as symmetrically as shown in FIGS. 4 to 6, and therefore are also necessarily arranged asymmetrically in the proximity of a central spatial point. In this case an unequal number of spatial points can have been scanned before and after the central spatial point.

It is not required to scan the spatial points from the laser scanner 1 using a predefined scanning step size of the angle $\Theta$, $\phi$. In awareness of the invention, a person skilled in the art can also use a non-triggered laser scanner, which does not have such a scanning step size.

If no measured values of distances r are provided for individual scanning directions ($\Theta$, $\phi$), a person skilled in the art can generate suitable values of distances r by interpolation in combination with the described aggregation.

In awareness of the present invention, a person skilled in the art can also aggregate the measured intensities (grayscales) and/or spectral values (colors) in the same manner as the distances.

Figure 7:
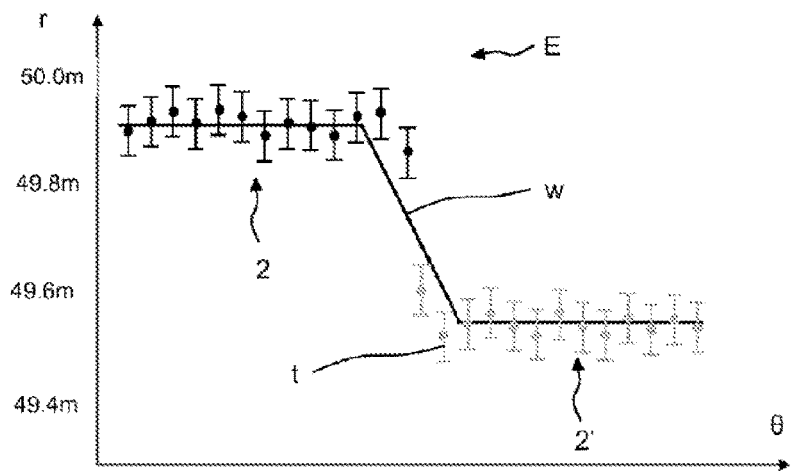
FIGS. 7 and 8 are other illustrations in one of the embodiments according to FIGS. 4 to 6 of the aggregation of coordinates of ascertained distance vectors in the method according to FIG. 3.
Figure 8:
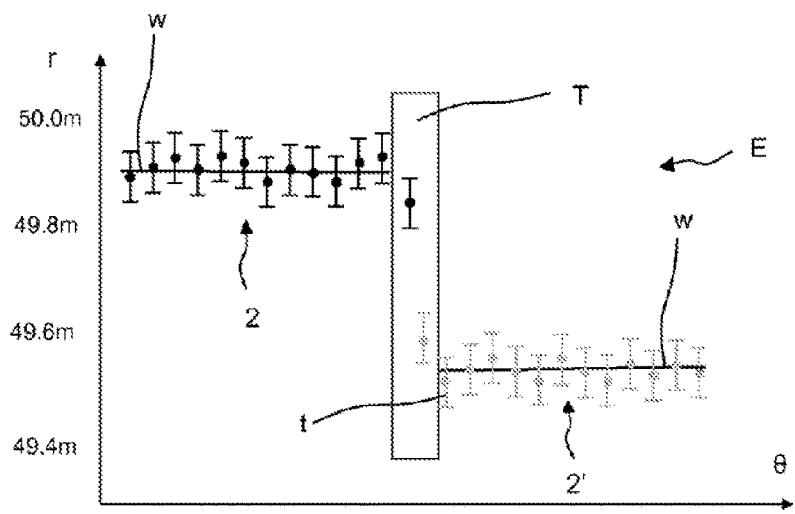

FIGS. 7 and 8 show further illustrations of the aggregation of the ascertained distance vectors E using the analysis unit 3. The ordinate indicates the distances r of the distance vectors E communicated to the analysis device 3 and the abscissa indicates the polar angle $\Theta$ of the distance vectors E communicated to the analysis device 3. In the left region of the ascertained distance vectors E, the distances r of the distance vectors E are in a value range from 49.8 m and 50.0 m to the first cube 2 according to FIG. 1; in the right region of the ascertained distance vectors E, the distances r of the distance vectors E are in a value range of 49.4 m and 49.6 m to the second cube 2' according to FIG. 1. The weighted arithmetic mean w ascertained by the analysis unit 3 is plotted continuously for all ascertained distance vectors E in FIG. 7 and is not plotted continuously for only a part of the ascertained distance vectors E of the left region and of the right region in FIG. 8.

The second cube 2', which schematically shows a tree, for example, now partially conceals the field of vision of the laser scanner 1 on the first cube 2, which schematically shows a building, for example. In particular in the transition region of the field of vision of the laser scanner 1 from the second cube 2' to the first cube 2, the aggregation of the coordinates r, $\Theta$, $\phi$ of ascertained distance vectors E corrupts the information content of the ascertained distance vectors E, in that they aggregate the sudden transition of the distances r into a flowing transition of the arithmetic mean w, which does not really exist.

To avoid such corruptions, according to FIG. 8, only coordinates r, $\Theta$, $\phi$ of those spatial points are aggregated, the measured distances r of which differ from the distance $r_0$ measured in the central spatial point S by not more than a defined threshold value t. In a middle exclusion range T, a weighted arithmetic mean w is therefore not plotted for the ascertained distance vectors E.

The threshold value t of the central spatial point S is plotted as bars in FIGS. 7 and 8. The length of the bar corresponds to the threshold value t and is uniformly 0.10 m.

The threshold value t is composed according to equation (5) of a sum of a constant displacement value $t_0$ and a measured value $t_1$.

$$t = t_0 + t_1 \quad (5)$$

In a first embodiment, the measured value $t_1$ is proportional to the amplitude A of the registered light 15' measured by the detector 17. The amplitude A is dependent on multiple parameters such as the reflectivity of the surface of the object 2, 2', the distance r between the laser scanner 1 and the object 2, 2', the angle of incidence of the light 15 on the object 2, 2', etc. For every ascertained distance vector E between the laser scanner 1 and the scanned spatial point, the amplitude A measured by the detector is stored with the 3D triple of the ascertained distance vector E on the computer-readable data memory. Other exponents are possible. Instead of the inverse proportionality:

$$t_1 \sim A^{-1} \quad (6)$$

a relationship:

$$t_1 \sim A^{1/2} \quad (6')$$

$$t_1 \sim A^{-3/2} \quad (6'')$$

can also be used. In general, the measured value $t_1$ is proportional to a power of the measured amplitude A having an arbitrary real exponent. Instead of the amplitude A, which is measured by the detector 17, of an ascertained distance vector E, an averaged amplitude A' of the measured amplitudes A of multiple ascertained distance vectors E can also be used.

In a second embodiment, the measured value $t_1$ is derived for a signal-to-noise ratio SNR of the registered light 15'. For example, the measured value $t_1$ is inversely proportional to the signal-to-noise ratio SNR of the registered light 15', as shown in the formula (7).

$$t_1 \sim SNR^{-1} \quad (7)$$

Other exponents of the signal-to-noise ratio SNR are also possible here.

In a third embodiment, the threshold value t is proportional to a difference of a parameter p and the distance r from the laser scanner 1 to the scanned spatial point, as shown in the formula (8).

$$t \sim (p-r)^{-1} \quad (8)$$

The difference can also have other exponents, of course.

In a further embodiment, the threshold value t can also be selected depending on the local curvature (first order or higher order) of the scanned object.

Since the distance vector E represents a 3D triple in relation to a (r, Θ, φ) coordinate system in the general case, there are fundamentally three threshold values t, the one described for r, but also one for Θ and one for φ. All three threshold values t may be derived from the statistical signal parameters A, SNRr, SNRΘ, SNRφ, and the object-related trajectories of the spatial point sequences, for example, the discussed local curvature. For example, the threshold values t_j are, according to formula (9):

$$t\_j = \text{function}(A, \text{SNR}j, \ldots) \quad (9)$$

Here A stands for the signal amplitude of the distance measurement, SNRj stands for statistical noise specifications of the coordinate measured values r, Θ, φ. In the simplest case, the scattering can be used as the second moment of the statistical distribution of the respective variable.

For scanned spatial points which exceed the limit of the threshold value t in the exclusion region T, the filter Θ can be adapted. For example, if the third spatial point in the first region segment N' and the first spatial point in the third region segment N" exceed the limit of the threshold value t in the two-dimensional vicinity N according to FIG. 5, the uniform filter $$\Theta = \frac{1}{9}\begin{bmatrix} 1 & 1 & 1 \\ 1 & 1 & 1 \\ 1 & 1 & 1 \end{bmatrix}$$

according to formula (3) can be replaced by an adapted filter $$\Theta = \frac{1}{7}\begin{bmatrix} 0 & 1 & 1 \\ 1 & 1 & 1 \\ 1 & 1 & 0 \end{bmatrix},$$

which does not consider these spatial points which exceed the limits of the threshold value t. Accordingly, the centrally weighted filter $$\Theta = \frac{1}{12}\begin{bmatrix} 1 & \sqrt{2} & 1 \\ \sqrt{2} & 4(2-\sqrt{2}) & \sqrt{2} \\ 1 & \sqrt{2} & 1 \end{bmatrix}$$

according to formula (3') can be replaced by an adapted filter $$\Theta = \frac{1}{10}\begin{bmatrix} 0 & \sqrt{2} & 1 \\ \sqrt{2} & 4(2-\sqrt{2}) & \sqrt{2} \\ 1 & \sqrt{2} & 0 \end{bmatrix},$$

which does not consider these spatial points which exceed the limits of the threshold value t. The adapted filter is advantageously symmetrical, i.e., if only the third spatial point in the first region segment N' exceeds the limit of the threshold value t in the two-dimensional vicinity N according to FIG. 5, for example, the first spatial point in the third region segment N" is also not considered for reasons of symmetry.

In a further embodiment, the size and the weighting of the filter can also be defined as a function of the measured distances, amplitudes, and the signal-to-noise ratio, so that different filters are used for small and large distances, for example.

In another embodiment, the filter can be designed in such a manner that the averaging of the 3D points occurs not only on the distance measured values but rather on all three measured coordinates r, Θ, φ, in this case, for example, one of the formulas (2), (2'), (2"), (3), (3') is applied for each of the coordinates r, Θ, φ.

It is apparent that these illustrated figures only schematically illustrate possible embodiments. The various approaches can also be combined with one another and with methods and devices of the prior art. In particular, the embodiments of the threshold value can be combined with one another.

What is claimed is:

1. A method for measuring spatial points using a laser scanner, the method comprising:
   scanning a plurality of spatial points of an object,
   ascertaining coordinates of a respective spatial point, wherein the laser scanner forms the coordinate origin and the coordinates comprise a distance and two angles;
   defining a two-dimensional vicinity around a central spatial point, having spatial points which are less than or equal to two scanning step sizes of an angle around the central spatial point, aggregating coordinates of the spatial points in the defined vicinity; and
   replacing coordinates of the central spatial point by the aggregation of coordinates of the spatial points in the defined vicinity.

2. The method according to claim 1, wherein the spatial points are scanned by the laser scanner using a scanning step size of an angle.

3. The method according to claim 2, wherein, while using these scanned spatial points, a vicinity is defined, wherein at least those scanned spatial points, which are less than or equal to two scanning step sizes of the angle around the central spatial point, are considered to be adjacent to the central spatial point.

4. The method according to claim 1, wherein
   the spatial points are scanned by the laser scanner in at least three region segments having the scanning step size of a first angle; and
   while using these region segments, a vicinity is defined, wherein at least those region segments, which are less than or equal to two scanning step sizes of a second angle around the central spatial point are considered to be adjacent to the central spatial point.

5. The method according to claim 1, wherein a vicinity which is symmetrical in the angle space is defined, wherein a number of spatial points arranged symmetrically in relation to the central spatial point is defined as the vicinity in the angle space.

6. The method according to claim 1, wherein respectively the distance of the spatial points is aggregated in the defined vicinity.

7. The method according to claim 1, wherein respectively three coordinates of the spatial points are aggregated in the defined vicinity.

8. The method according to claim 1, wherein coordinates of the central spatial point are replaced by a mean value of coordinates in the defined vicinity, wherein at least the distance of the central spatial point is replaced.

9. The method according to claim 1, wherein the aggregation of coordinates in the defined vicinity is weighted by a settable filter.

10. The method according to claim 9, wherein the spatial points in the vicinity are equally weighted by the filter.

11. The method according to claim 9, wherein the spatial points in the vicinity are unequally weighted by the filter.

12. The method according to claim 1, wherein only coordinates of those spatial points are aggregated, the measured distances of which differ from the distance measured in the central spatial point by not more than a defined threshold value.

13. The method as claimed in claim 12, wherein a threshold value is used, which has a sum of a constant displacement value and a measured value, wherein a measured value is used, which
   is inversely proportional to a measured amplitude of the registered light,
   is proportional to a power of a measured amplitude of the registered light having a real exponent, and/or
   is derived from the signal-to-noise ratio of the registered light.

14. The method according to claim 1, wherein
   the aggregation of coordinates in the defined vicinity is weighted by a settable filter, and
   scanned spatial points, the measured distances of which differ from the distance measured in the central spatial point by more than a defined threshold value, are filtered out by an adapted filter.

15. The method according to claim 1, wherein the vicinity is defined with the use of three spatial points scanned in chronological sequence by the laser scanner, wherein at least one scanned spatial point has been scanned chronologically before the central spatial point and at least one scanned spatial point has been scanned chronologically after the central spatial point.

16. A system comprising:
   a laser scanner configured to:
      scan a plurality of spatial points of an object; and
      ascertain coordinates for each of the spatial points, wherein the laser scanner forms the coordinate origin and the coordinates comprise a distance and at least two angles; and
   an computer configured to:
      define a two-dimensional vicinity around a central spatial point, having spatial points which are less than or equal to two scanning step sizes of an angle around the central spatial point,
      aggregate coordinates of the spatial points in the defined vicinity, and
      replace coordinates of the central spatial point by the aggregation of coordinates of the spatial points in the defined vicinity are executable.

17. A non-transitory computer program product having program code, which is stored on a machine-readable carrier, for executing the method comprising:
   reading in data representing a plurality of spatial points of an object gathered through scanning the object with a laser scanner;
   defining a two-dimensional vicinity around a central spatial point, having spatial points which are less than or equal to two scanning step sizes of an angle around the central spatial point, aggregating coordinates of the spatial points in the defined vicinity, and
   replacing coordinates of the central spatial point by the aggregation of coordinates of the spatial points in the defined vicinity, when the program is executed in an analysis unit; and
   storing the replaced coordinates of the plurality of spatial points as a modified 3D point cloud.

18. A method for measuring spatial points by means of a laser scanner, the method comprising:
   scanning a plurality of spatial points of an object;
   ascertaining coordinates of the respective spatial point, wherein the laser scanner forms the coordinate origin and the coordinates comprise a distance and at least one angle;
   defining a vicinity around a central spatial point, having at least two spatial points,
      the angle coordinates of which in a defined angle space are adjacent to that of the central spatial point, and
      the measured distances of which differ from the distance measured in the central spatial point by not more than a defined threshold value;
   aggregating coordinates of the spatial points in the defined vicinity; and
   replacing coordinates of the central spatial point by the aggregation of coordinates of the spatial points in the defined vicinity.

19. The method according to claim 18, wherein a threshold value is used, which has a sum of a constant displacement value and a measured value, wherein a measured value is used, which:
   is inversely proportional to a measured amplitude of the registered light,
   is proportional to a power of a measured amplitude of the registered light having a real exponent, and/or
   is derived from the signal-to-noise ratio of the registered light.

20. The method according to claim 18, wherein a vicinity is defined with the use of three spatial points scanned in chronological sequence by the laser scanner, wherein at least one scanned spatial point has been scanned chronologically before the central spatial point and at least one scanned spatial point has been scanned chronologically after the central spatial point.

21. The method according to claim 18, wherein a vicinity which is symmetrical in the angle space is defined, wherein a number of spatial points arranged symmetrically in relation to the central spatial point is defined as the vicinity in the angle space.

22. The method according to claim 18, wherein respectively the distance of the spatial points is aggregated in the defined vicinity.

23. The method according to claim 18, wherein respectively three coordinates of the spatial points are aggregated in the defined vicinity.

24. The method according to claim 18, wherein coordinates of the central spatial point are replaced by a mean value of coordinates in the defined vicinity.

25. The method according to claim 18, wherein the aggregation of coordinates in the defined vicinity is weighted by a settable filter.

26. The method as claimed in claim 25, wherein the spatial points in the vicinity are equally weighted by the filter.

27. The method according to claim 25, wherein the spatial points in the vicinity are unequally weighted.

28. The method according to claim 18, wherein a two-dimensional vicinity around the central spatial point is ascertained, wherein the vicinity has at least two spatial points, the first angle coordinate of which in a defined angle space is adjacent to that of the central spatial point, and at least two spatial points, the second angle coordinate of which in a defined angle space is adjacent to that of the central spatial point.

29. The method according to claim 18, wherein the spatial points are scanned by the laser scanner in at least three region segments having the scanning step size of a first angle; and while using these region segments, a vicinity is defined, wherein at least those region segments, which are less than or equal to two scanning step sizes of a second angle around the central spatial point are considered to be adjacent to the central spatial point.

30. A system comprising:

a laser scanner configured to:
  scan a plurality of spatial points of an object, and
  ascertain coordinates for each of the spatial points, wherein the laser scanner forms the coordinate origin and the coordinates comprise a distance and at least one angle, an computer configured to:
  define a vicinity around a central spatial point, having spatial points which are less than or equal to two scanning step sizes of an angle around the central spatial point,
  aggregate coordinates of the spatial points in the defined vicinity, and
  replace coordinates of the central spatial point by the aggregation of coordinates of the spatial points in the defined vicinity are executable.

31. A non-transitory computer program product having program code, which is stored on a machine-readable carrier, for executing a method comprising:

reading in data representing a plurality of spatial points of an object gathered through scanning the object with a laser scanner;

defining a vicinity around a central spatial point, having spatial points which are less than or equal to two scanning step sizes of an angle around the central spatial point, aggregating coordinates of the spatial points in the defined vicinity, and replacing coordinates of the central spatial point by the aggregation of coordinates of the spatial points in the defined vicinity, when the program is executed in an analysis unit; and storing the replaced coordinates of the plurality of spatial points as a modified 3D point cloud.

* * * * *